Elijah Young
Seed-Planter.
No. 3,383. Reissued April 13, 1869.
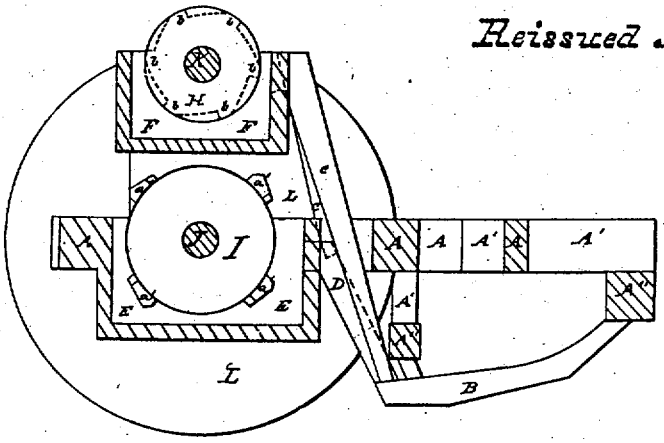
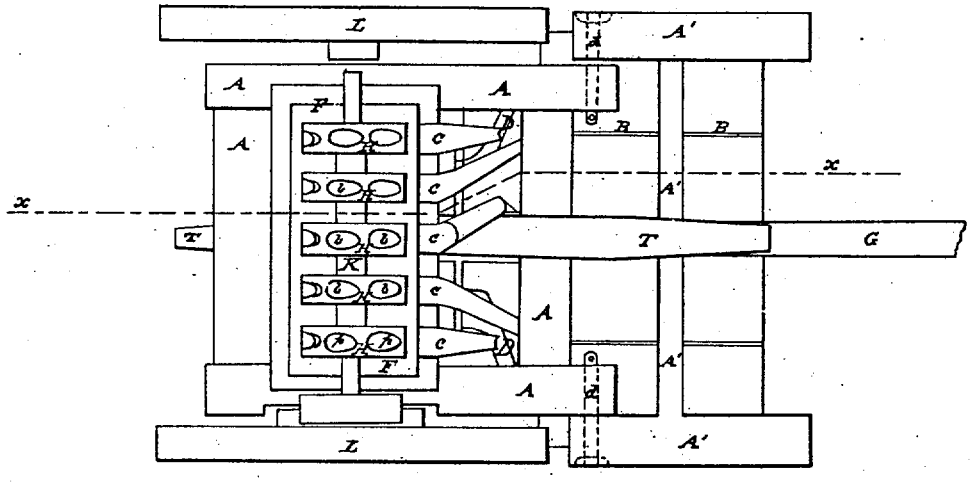
WITNESSES.
Albert Millet.
H. Pauly
INVENTOR.
E. Young
By his Attys
M. Randolph & Co.

UNITED STATES PATENT OFFICE.

ELIJAH YOUNG, OF FAYETTEVILLE, MISSOURI.

IMPROVEMENT IN SEED-PLANTERS.

Specification forming part of Letters Patent No. 28,936, dated June 26, 1860; Reissue No. 3,383, dated April 13, 1869.

*To all whom it may concern:*

Be it known that I, ELIJAH YOUNG, of Fayetteville, in the county of Johnson and State of Missouri, have invented a new and useful Machine for Planting Corn and Small Cereals; and whereas the said machine was patented by me on the 26th day of June, A. D. 1860, and whereas the said patent was imperfect and incomplete by reason of an unnecessarily limited claim, I do now therefore declare the following to be a full and clear description of the said machine and the mode of using it.

The machine consists of a frame-work mounted on wheels and having two seed-boxes and dropping devices, one of which is for use in dropping or planting corn and the other for planting or drilling small cereals, such as wheat, &c. Plows or markers for opening the ground are also employed with this machine, and are attached to the frame in advance of the seeding apparatus.

The principal feature of the invention consists of a peculiar elevator device for raising the seeds from the seed boxes or hoppers and depositing them in tubes, which conduct the seeds so raised to the heels of the marking-plows, where they are buried in the earth. These elevators are merely rotating disks with concave serrations in their peripheries for raising the seeds and depositing them in the proper discharge-tubes.

To enable those skilled in the art to make and use my improved drilling and planting machine, I will proceed to describe its construction and operation.

Figure 1 of the drawings is a longitudinal sectional elevation of one of the improved machines. Fig. 2 is a general plan of the same.

The frame A is supported on the wheels L, and the front or vibrating frame, A′, to which the plows are attached, is secured to the frame A by means of the pivot-pins *a*. The frame A supports two seed-boxes, E and F, the lower one, E, being intended for planting corn, and the other one, F, is placed directly over it, and is intended for planting small cereals. A shaft, J, running the entire length of the lower box, has its bearings provided therein, and a similar shaft, K, has its bearings provided in the upper seed-box. To the lower shaft, J, one or more rotating disks, I, are secured, and the peripheries of these disks are studded with small cups or pockets *a′* at regular intervals. When these disks are rotated and the box E is filled with grain, each cup or pocket will fill itself in passing through the grain, and then as it passes over the top front side of the wheel or disk it will deposit its load into one of the tubes D leading to the heel of the plow or marker B, where the seed will be buried in the earth. By placing the pockets *a′* at regular intervals on the periphery of the disks, the seeds will be planted at regular and uniform distances in the rows.

To the upper shaft, K, there are attached numerous disks, H, as shown best in Fig. 2. The peripheries of these disks are thickly studded with small concave serrations *b*, which as the disks are revolved receive and deposit the grain in the same manner as that above described for the cups or pockets *a* of the lower disk. These upper disks discharge the grain into the tubes *c*, leading either into the tubes D or directly to the heels of the markers B. Both the shafts J and K are revolved by suitable belting or gearing (not shown) from the actuating-wheels L L. Of course, when corn is to be planted, the lower disks and seed-box alone will be used, and when small cereals are to be planted the upper disks will be used, while the lower ones remain stationary.

The plows B may be common marking-plows, or they may be any plows suitable for the purpose.

Having described my invention, what I claim is—

The seed-boxes E F and their dropping-disks I H, and delivery-tubes D *c*, when combined and arranged as and for the purpose set forth.

ELIJAH YOUNG.

Witnesses:
M. RANDOLPH,
ROBERT BURNS.